United States Patent [19]
Weil et al.

[11] Patent Number: 4,544,839
[45] Date of Patent: Oct. 1, 1985

[54] LASER BEAM MONITORING SYSTEM

[75] Inventors: Bradley S. Weil, Knoxville; Grady R. Wetherington, Jr., Harriman, both of Tenn.

[73] Assignee: The United States of America as represented by the United States Department of Energy, Washington, D.C.

[21] Appl. No.: 450,305

[22] Filed: Dec. 16, 1982

[51] Int. Cl.$^4$ ............................................. G01J 1/32
[52] U.S. Cl. ........................... 250/205; 219/121 LG
[58] Field of Search ........................ 250/205, 237 G; 219/121 LA, 121 LB, 121 LG, 121 LN; 83/521; 362/802; 376/326

[56] References Cited

U.S. PATENT DOCUMENTS

| | | | |
|---|---|---|---|
| 4,000,391 | 12/1976 | Yeo | 219/121 LG |
| 4,311,389 | 1/1982 | Fay et al. | 250/237 G |
| 4,317,021 | 2/1982 | Walch et al. | 219/121 LG |
| 4,406,530 | 9/1983 | Hasegawa et al. | 250/205 |
| 4,466,739 | 8/1984 | Kasner et al. | 356/138 |

FOREIGN PATENT DOCUMENTS 2040549 8/1980 United Kingdom ......... 219/121 LA

OTHER PUBLICATIONS

Development of Design Support Information for Laser Cutting System-Program Extension, by United Technologies, Oct. 1980.
Laser Cutting System Assessment, Racki et al., Apr. 1981.
Development of Design Support Information for a Laser Cutting System, by United Technologies, Mar. 1980.

Primary Examiner—David C. Nelms
Assistant Examiner—Jim Gatto
Attorney, Agent, or Firm—Edwin D. Grant; Stephen D. Hamel; Judson R. Hightower

[57] ABSTRACT

Laser beam monitoring systems include laser-transparent plates set at an angle to the laser beam passing therethrough and light sensor for detecting light reflected from an object on which the laser beam impinges.

5 Claims, 1 Drawing Figure

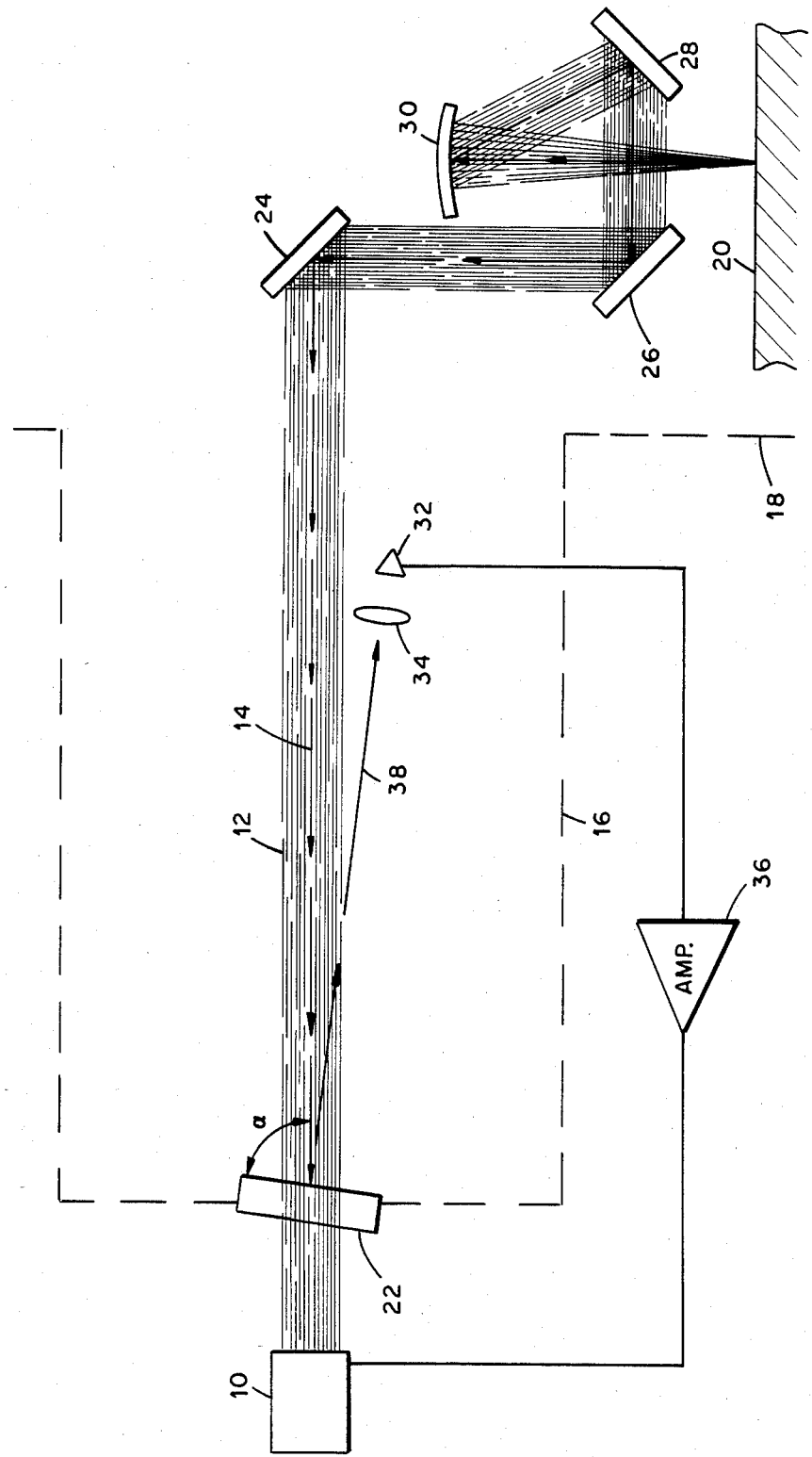

LASER BEAM MONITORING SYSTEM

BACKGROUND OF THE INVENTION

This invention, which resulted from a contract with the United States Department of Energy, relates to a system for monitoring the operation of a laser beam used for cutting or other purposes.

The use of a laser beam to cut spent nuclear fuel elements into pieces has led to the development of optical systems for directing a laser beam into a sealed radiation-shielding chamber and focusing the beam at a predetermined point therein, as exemplified by the laser beam alignment system disclosed in U.S. patent application Ser. No. 352,744, filed by Kasner et al on Feb. 26, 1982, and assigned to the assignee of this application, the United States Department of Energy. There has continued to be a need, however, for a simple and trustworthy means for detecting the placement of an obstruction in the path of a laser beam used for cutting a fuel element, after the laser beam has been properly aligned and focused and cutting has commenced. It has been proposed heretofore to use an infrared detector for this purpose, the detector being located in the chamber in which fuel elements are cut. However, the response time required for an infrared detector so located to terminate the operation of a laser cell, if the path of the laser beam is blocked, is excessive from the standpoint of safety in controlling the cutting operation. Location of an infrared sensor inside a radiation-shielding chamber also creates difficulties in routing and handling the electric cable that must extend from the sensor to a point outside the chamber.

SUMMARY OF THE INVENTION

It is therefore an object of this invention to provide an improved system for monitoring the operation of a laser beam used for cutting depleted nuclear fuel elements.

Another object of the invention is to provide a system which can detect a blockage of a laser beam in a shorter time than is possible with infrared detection systems heretofore used for the same purpose.

These objects are achieved by a preferred embodiment of the invention comprising a laser cell which directs a laser beam along a first path, a mirror positioned to intercept said laser beam travelling along said first path and deflect it toward an object such as used nuclear fuel element, a laser-transparent plate positioned on said first path between said laser cell and said mirror so that said laser beam passes therethrough, said plate being inclined relative to said first plate and light which travels from said object to said mirror and thence along said first path being deflected from said plate along a second path diverging from said first path, and means for detecting said light traveling along said second path.

DESCRIPTION OF THE DRAWING

The drawing is a schematic representation of the preferred embodiment of the invention.

DETAILED DESCRIPTION OF THE PREFERRED EMBODIMENT OF THE INVENTION

In the drawing, reference number 10 designates a laser generating cell (such as a $CO_2$-type) which directs a laser beam 12 along a first path the longitudinal axis of which is designated by reference number 14. Cell 10 is located adjacent a housing 16 mounted on a large sealed chamber 18 in which a spent nuclear fuel element 20 is held, the interior of the housing communicating with the interior of the chamber. A laser-transparent plate 22 is located in the wall of housing 16 next to laser cell 10, the opposed, parallel faces of the plate being inclined at an acute angle $\Gamma$ relative to the longitudinal axis 14 of laser beam 12. Preferably plate 22 is formed of zinc selenide, a material that transmits approximately 75% of the laser beam of a $CO_2$ laser cell, and angle $\alpha$ is preferably about 83°.

Positioned inside chamber 18 and centered on the longitudinal axis 14 of the aforesaid first path traveled by laser beam 12 is a mirror 24 which deflects said beam toward fuel element 20. As will be understood by persons skilled in the art of laser cutting techniques, auxiliary mirrors 26,28 and a focusing mirror 30 can be used in conjunction with mirror to direct laser beam 12 to a predetermined point within chamber 18. Preferably, the mirrors are formed of highly polished molybdenum.

A light-responsive sensor 32 (such as a phototransistor) is positioned adjacent the aforesaid first path traveled by laser beam 12, and a focusing lens 34 is positioned between the sensor and plate 22. Sensor 32 is connected through an amplifier 36 to a conventional mechanism in laser cell 10 that closes a shutter therein.

OPERATION OF THE PREFERRED EMBODIMENT OF THE INVENTION

When laser cell 12 is operating, laser beam 12 passes through plate 22 and travels along the aforedescribed first path between the cell and mirror, the beam then being deflected by mirror 24, auxiliary mirrors 26,28 and focusing mirror to the stainless steel casing of spent nuclear fuel element 20. When exposed to the laser beam, the casing of fuel element 20 becomes white hot and radiates intense visible light, a portion of which travels back along the beam path toward laser cell 10. Since the ZnSe plate 22 is turned at an angle relative to the longitudinal axis 14 of the path between cell 10 and mirror 24, a portion of the light from the casing of fuel element 20 is reflected from the face of plate 22 nearest mirror 24 and travels along the path designated by reference number 38 in the drawing, this path being referred to as the "second path" in claims appended hereto. Lens 34 concentrates this visible light on the phototransistor light sensor 32, and the amplifier circuit connected with the sensor and with laser cell 10 generates an electrical signal which maintains a conventional shutter in the cell in open position. However, if the laser beam and light path between plate 22 and fuel element 20 is blocked in some way, visible light will no longer impinge on sensor 32 and a signal is transmitted from the sensor to cell 10 which closes the shutter therein. Experimental tests have shown that the response time required for the described monitoring system to cut off laser beam 12 if a blockage occurs is less than 50 ms, which is much faster than the response time for known laser beam monitoring systems. Other significant advantages of the invention are: (1) no electronic equipment or cabling is required inside a radiation-shielding chamber 18 in which spent fuel elements are fragmented by a laser beam., (2) no critical sensor alignment is needed; (3) a phototransistor and lens combination that is satisfactory for use in the monitoring system can be purchased commercially, and (4) the control sensor can be mounted in a housing 16 outside the radiation-shielding chamber 18.

What is claimed is:

1. A system for monitoring a laser beam, comprising:

a laser cell directing a laser beam along a first path;

a mirror positioned to intercept said laser beam traveling along said first path and deflect it toward an object;

a laser-transparent plate positioned on said first path between said laser cell and said mirror so that said laser beam passes therethrough, said plate being inclined relative to said first path, light which travels from said object to said mirror and thence along said first path being deflected from said plate along a second path diverging from said first path;

a light-responsive sensor for sensing said light traveling along said second path and generating an output signal when said light is cut off; and means responsive to said output signal for terminating the operation of said laser cell.

2. The system of claim 1 including a lens placed on said second path for focusing said light traveling therealong upon said sensor.

3. The system of claim 2 wherein said sensor is a phototransistor.

4. The system of claim 3 wherein said plate is formed of zinc selenide.

5. The system of claim 4 wherein the acute angle between the longitudinal axis of said first path and the faces of said plate is about 83°.

* * * * *